United States Patent [19]
Goodwin, III et al.

[11] Patent Number: 5,797,131
[45] Date of Patent: Aug. 18, 1998

[54] ELECTRONIC PRICE LABEL SUPPORT METHOD

[75] Inventors: John C. Goodwin, III, Suwanee; Terry L. Zimmerman, Lawrenceville, both of Ga.

[73] Assignee: NCR Corporation, Dayton, Ohio

[21] Appl. No.: 531,808

[22] Filed: Sep. 21, 1995

[51] Int. Cl.$^6$ ................................................. G06F 17/60
[52] U.S. Cl. ............................................................. 705/16
[58] Field of Search ................................. 395/216, 218, 395/220, 221, 222, 238; 283/55; 705/16, 18, 20, 21, 22, 38

[56] References Cited

U.S. PATENT DOCUMENTS

| | | | |
|---|---|---|---|
| 4,841,442 | 6/1989 | Hosoyama | 705/20 |
| 4,855,908 | 8/1989 | Shimoda et al. | 705/20 |
| 5,464,289 | 11/1995 | Beaudry | 400/62 |
| 5,537,312 | 7/1996 | Sekiguchi et al. | 705/14 |

*Primary Examiner*—Gail O. Hayes
*Assistant Examiner*—Alexander Kalinowski
*Attorney, Agent, or Firm*—Paul W. Martin

[57] ABSTRACT

An electronic price label (EPL) support method in which support of an EPL system may be provided by a main computer in a store, a host computer coupled to the main computer and other main computers in a chain of stores, or a combination of both. The support method includes a method of modifying an EPL system within a transaction establishment. The host computer creates a price look-up (PLU) batch file containing changes to a PLU data file of the store and sends it to the main computer. The main computer applies the PLU batch file. Either the host or main computer provides an EPL batch file for modifying an EPL data file in response to the changes in the PLU data file. When provided by the host, the EPL batch file may contain temporary identification numbers for new EPLs. Either the host or main computer may additionally provide overlays for new EPLs, reassigned EPLs, and replacement EPLs.

4 Claims, 10 Drawing Sheets

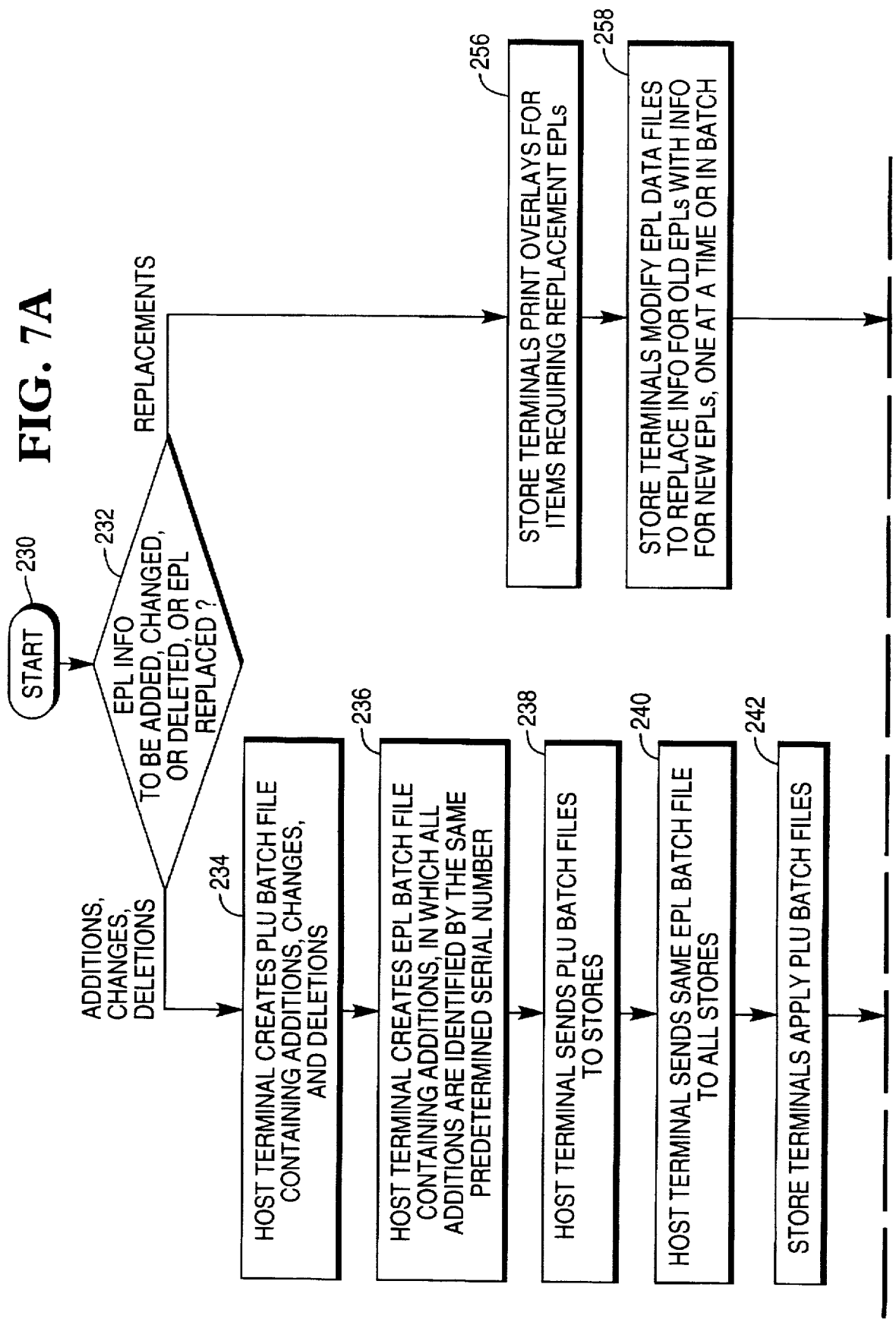

5,797,131

ELECTRONIC PRICE LABEL SUPPORT METHOD

BACKGROUND OF THE INVENTION

The present invention relates to electronic price label (EPL) systems, and more specifically to an EPL support method.

In a traditional retail store, bar code scanners rely on price information maintained within a price-lookup (PLU) file. The PLU file is typically stored in a single location at a main server.

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. The EPL data file contains EPL identification information, EPL merchandise item information, and price verifier information, such as, a checksum value. Price information displayed by the EPLs is obtained from the PLU file.

After the initial installation of the EPLs within a chain of stores, support for the EPLs within each store may be controlled by a host computer or by main computers in individual stores. Disadvantageously, known approaches require manual entry of all changes.

Therefore, it would be desirable to provide an automated EPL support method which improves the speed and reliability of changes.

SUMMARY OF THE INVENTION

In accordance with the teachings of the present invention, an EPL support method is provided. Under the method, support of an EPL system may be provided by a main computer in a store, a host computer coupled to the main computer and other main computers in a chain of stores, or a combination of both.

The support method includes a method of modifying an EPL system within a transaction establishment. The host computer creates a PLU batch file containing changes to a PLU data file of the store and sends it to the main computer. The main computer applies the PLU batch file. Either the host or main computer provide an EPL batch file for modifying an EPL data file in response to the changes in the PLU data file. When provided by the host, the EPL batch file may contain temporary identification numbers for new EPLs. Either the host or main computer may additionally provide overlays for new EPLs, reassigned EPLs, and replacement EPLs.

It is accordingly an object of the present invention to provide an EPL support method.

It is another object of the present invention to provide an EPL support method in which support may be provided by a main computer in a store, a host computer coupled to the main computer and other main computers in a chain of stores, or a combination of both.

It is another object of the present invention to provide a method of modifying an EPL system within a transaction establishment.

It is another object of the present invention to provide a method of adding EPLs, removing EPLs, reassigning EPLs, and replacing EPLs within an EPL system.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIGS. 7A and 7B form a flow diagram of a fifth embodiment of the EPL support method of the present invention.

DETAILED DESCRIPTION OF THE PREFERRED EMBODIMENT

Figure 1:
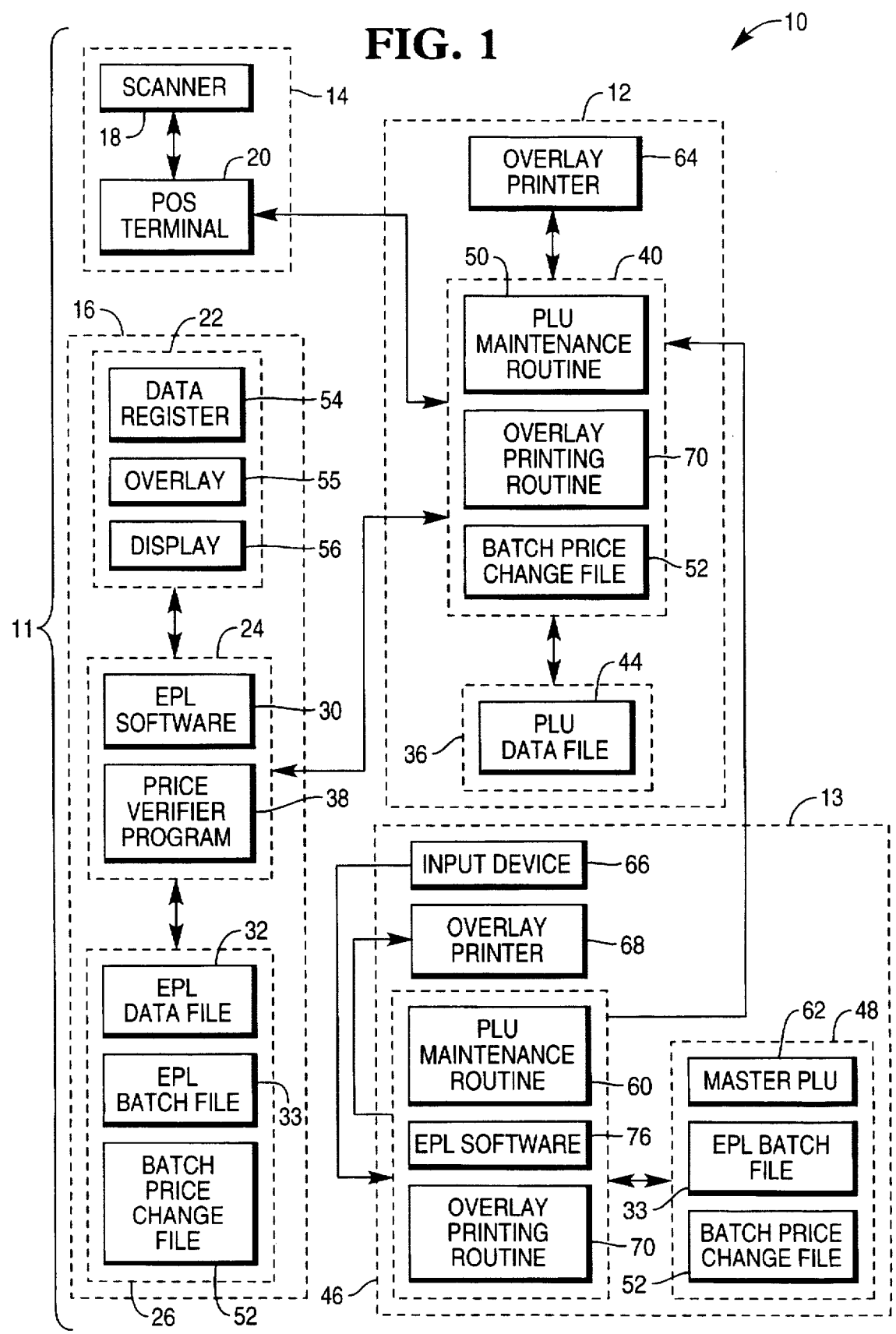
FIG. 1 is a block diagram of a store network.

Referring now to FIG. 1, a chain 10 of stores primarily includes a first store system 11 which includes main computer system 12, point-of-service (POS) system 14, and EPL system 16, and a common host terminal 13.

POS system 14 includes bar code scanner 18 and terminal 20.

EPL system 16 primarily includes EPLs 22, main EPL terminal 24, and EPL storage medium 26.

EPLs 22 are typically attached to shelves within a store and include a data register 54, an overlay 55, and a display 56. Data registers 54 contain data, usually the price of an item associated with an EPL on the shelves. The data is typically displayed by display 56. Overlays 55 are typically made of paper and display additional information that is typically not displayed electronically by EPLs 22.

Main EPL terminal 24 executes EPL software 30, which modifies and maintains the contents of EPL data file 32. For example, in one embodiment main EPL terminal 24 modifies EPL data file 32 to replace information for malfunctioning EPLs with information for replacement EPLs, one at a time or in batch through EPL batch file 33. EPL batch file 33 is created at host terminal 13 and copied to storage medium 26 of EPL system 16.

Main EPL terminal 24 also executes price verifier software 38, which is responsible for verifying that prices displayed by EPLs 22 for items stored within EPL data file 32 are the same as prices for those items contained within PLU data file 44. Price verifier software 38 calculates price checksum values from the price information within PLU data file 44.

EPL storage medium 26 stores EPL data file 32, and EPL batch file 33, and is preferably a fixed disk drive.

Main computer system 12 includes PLU storage medium 36, and main PLU terminal 40.

In one embodiment, main PLU terminal 40 executes PLU maintenance routine 50 to apply price changes to PLU data file 44. PLU maintenance routine 50 updates PLU file 44, prepares system 12 for a loss of PLU data file 44, and executes PLU data recovery procedures. PLU maintenance routine 50 preferably obtains price changes from host computer system 13 before applying them.

Main PLU terminal 40 also executes overlay printing routine 70 to cause overlay printer 64 to print overlays 55 to be attached to EPLs 22.

PLU storage medium 36 stores PLU data file 44 and may also store batch price change file 52. PLU file 44 is preferably the sole location for storing item prices and is available for distribution to POS terminal 20 by main PLU terminal 40. Alternatively, provision may be made for bar code scanner 18 to directly access primary PLU file 44 from main PLU terminal 40.

Batch price change file 52 is used by PLU maintenance routine 50 to update PLU data file 44 and by EPL software 30 to modify EPL data file 32 indirectly by creating an EPL batch file 33 to be applied.

Here, terminals 20, 24, and 40 are shown as separate components that are networked together, but they may also be combined in different ways. For example, EPL terminal 24 and main PLU terminal 40 may be combined to form a single main computer. POS terminal 20 and main PLU terminal 40 may be combined to form a POS terminal which doubles as a main computer for a network of other POS terminals.

Host terminal 13 includes PLU storage medium 48, terminal 46, and input device 66.

PLU storage medium 48 stores master PLU data file 62, batch price change file 52, and EPL batch file 33.

Terminal 46 executes PLU maintenance routine 60, which updates master PLU file 62. PLU maintenance routine 60 may either send batch price change file 52 to stores within chain 10 so that they can individually apply them, or may apply batch change file 52 directly to PLU data files within the chain to update them all at the same time.

Terminal 46 may also execute EPL software 76, which applies EPL batch file 33 directly to all EPL data files 32 within the chain to update them all at the same time.

Input device 66 is preferably a keyboard which is used to enter price changes and produce batch price change file 52.

Host terminal 13 may also include overlay printer 68. Terminal 46 may execute overlay printing routine 70 to cause overlay printer 68 to centrally print overlays 55 to be distributed to stores within chain 10 and attached to EPLs 22 as an alternative to individual store printing of overlays 55.

Figure 2:
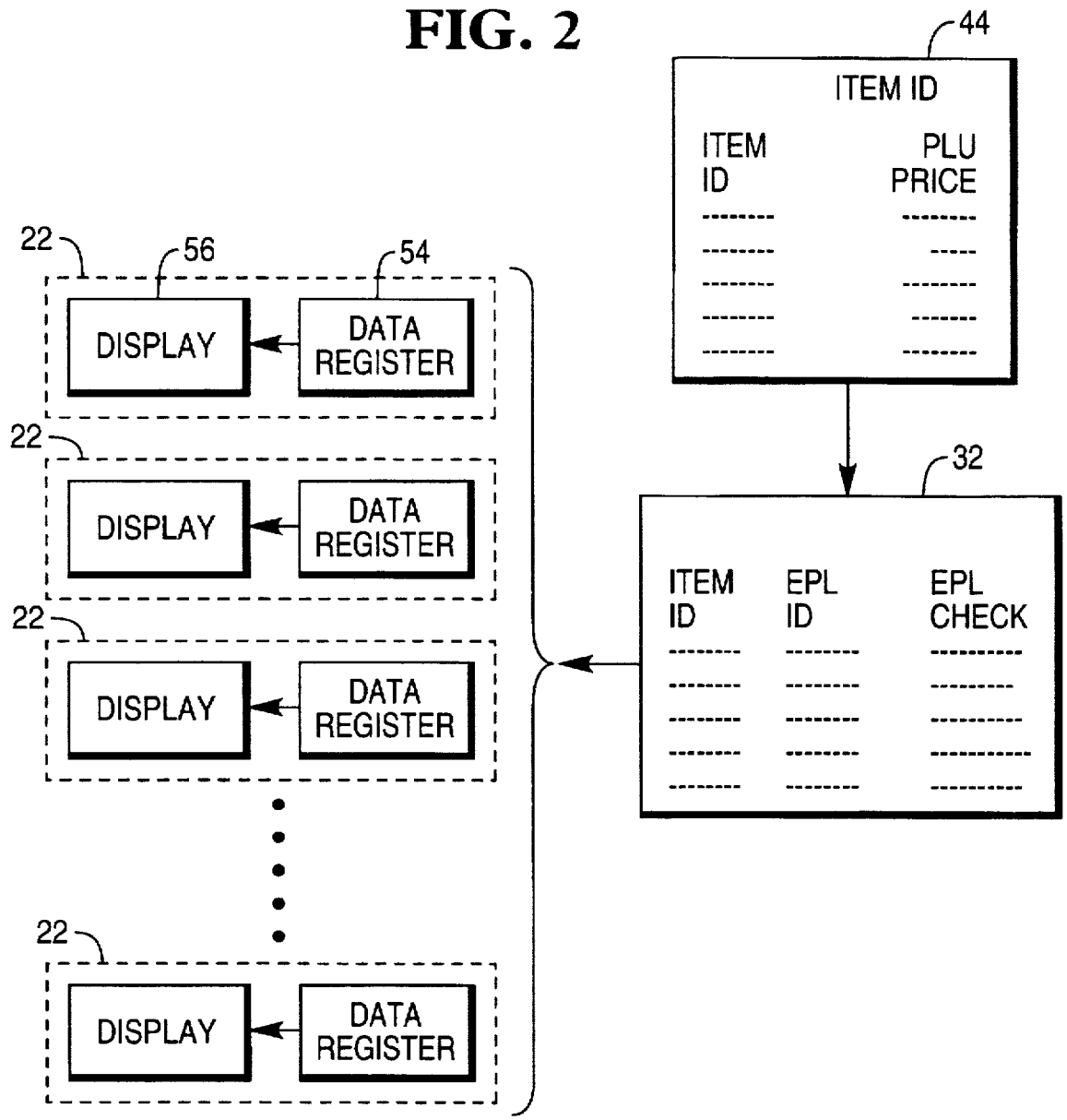
FIG. 2 is a diagram of the information within the PLU data file and the EPL data file.

Turning now to FIG. 2, EPL data file 32 and PLU data file 44 are shown in more detail. EPL data file 32 includes a line entry for each EPL 22 in EPL system 16. Each line entry has an item identification entry (ITEM ID), an EPL identification entry (EPL ID), and an EPL price checksum value entry (EPL CHECK) (or actual data bits).

Entry ITEM ID identifies a store item. Entry EPL ID identifies which EPL is assigned to the item. Entry EPL CHECK is a checksum value (or actual data bits) of the digits of the price information that is displayed by display 56.

PLU data file 44 includes a line entry for each item sold in each store of the chain. Each line entry has an item identification entry (ITEM ID), and a PLU price entry (PLU PRICE).

Entry ITEM ID identifies a store item. Entry PLU PRICE identifies the price read by POS system 14 to determine the price of each item during scanning by bar code scanner 18.

During normal operation, EPL terminal 24 obtains price information from PLU data file 44 and sends it to data register 54. Display 56 displays the price in data register 54. During a price mismatch situation, the price information from PLU data file 44 does not agree with the price displayed by EPL. Price verifier software 38 compares the price PLU file 44 with the price displayed by EPLs 22 by comparing entry EPL CHECK in EPL data file 32 with a checksum value (or actual data bits) it generates from the corresponding price in entry PLU PRICE.

Figure 3:
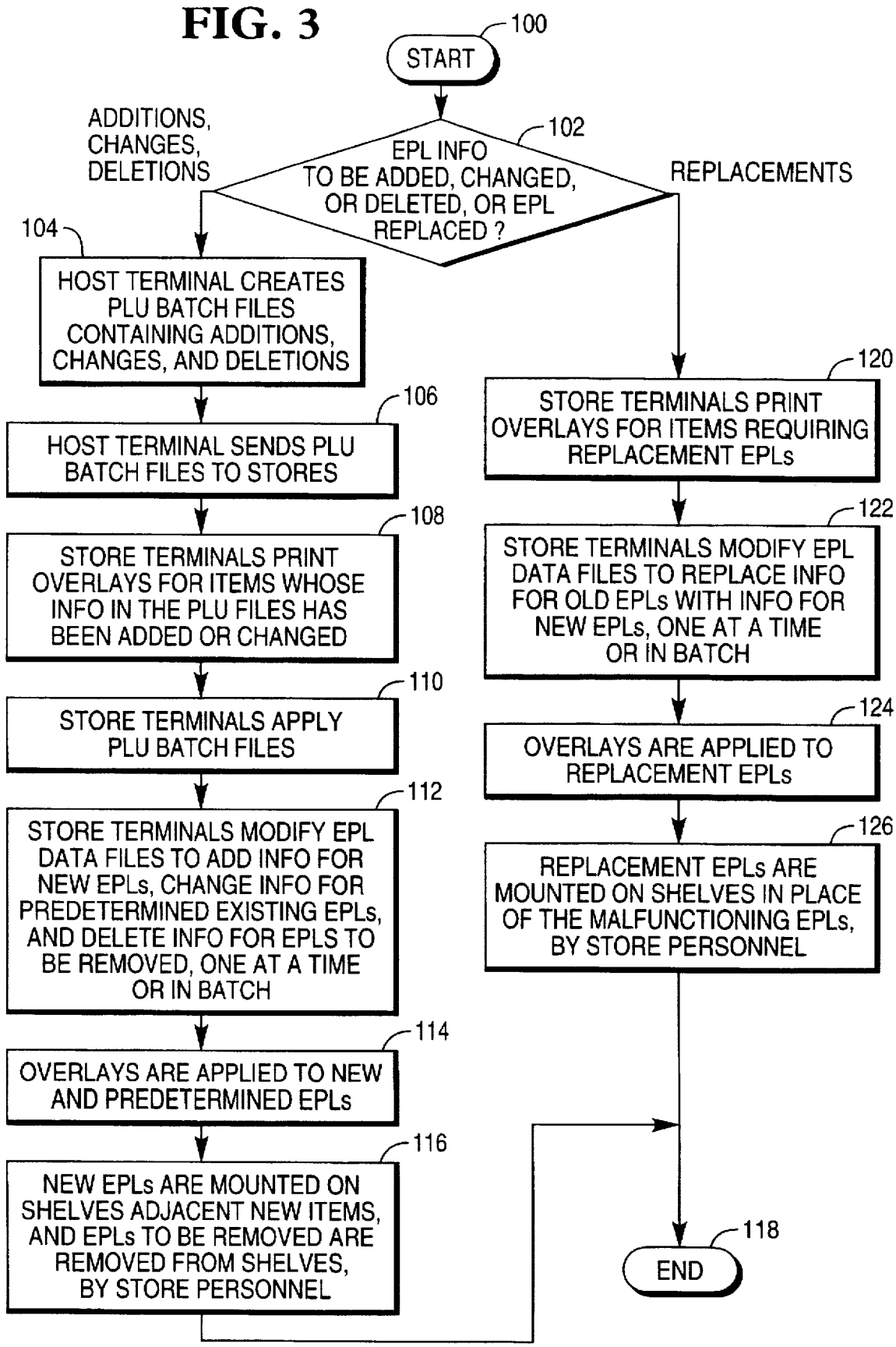
FIG. 3 is a flow diagram of a first embodiment of the EPL support method of the present invention.

Turning now to FIG. 3, a first method for controlling system 10 begins with START 100. In this method, a store has total control over EPL additions, changes, deletions, and replacements. The store provides EPLs to be used for new entries in EPL data file 32 and for replacing existing EPLs.

In step 102, the method determines whether EPL information is to be added, changed, or deleted, or whether an EPL is to be replaced.

If the former, host terminal 13 creates PLU batch files 52 containing additions, changes, and deletions in step 104.

In step 106, host terminal 13 sends PLU batch files 52 to main computers 12 in the chain of stores.

In step 108, main computers 12 print overlays 55 for items whose information in the PLU files 44 has been added or changed (other than price changes) using overlay printer 64.

In step 110, main computers 12 apply PLU batch files 52.

In step 112, main computers 12 modify EPL data files 32 to add information for new EPLs, change information for predetermined existing EPLs, and delete information for EPLs to be removed, one at a time or in batch.

In step 114, overlays 55 are applied to new and predetermined EPLs. Overlays 55 may be applied by an overlay application machine or by hand.

In step 116, new EPLs are mounted on shelves adjacent new items, and EPLs to be removed are removed from shelfs, by store personnel and the method ends in step 118.

Returning now to step 102, if EPLs are to be replaced because they are malfunctioning, main computers 12 print overlays 64 for items requiring replacement EPLs in step 120.

In step 122, main computers 12 modify EPL data files 32 to replace information for old EPLs with information for new EPLs, one at a time or in batch.

In step 124, overlays 55 are applied to replacement EPLs, by either an overlay application machine or by hand.

In step 126, replacement EPLs are mounted on shelves in place of the malfunctioning EPLs by store personnel.

The method ends at step 118.

Figure 4:
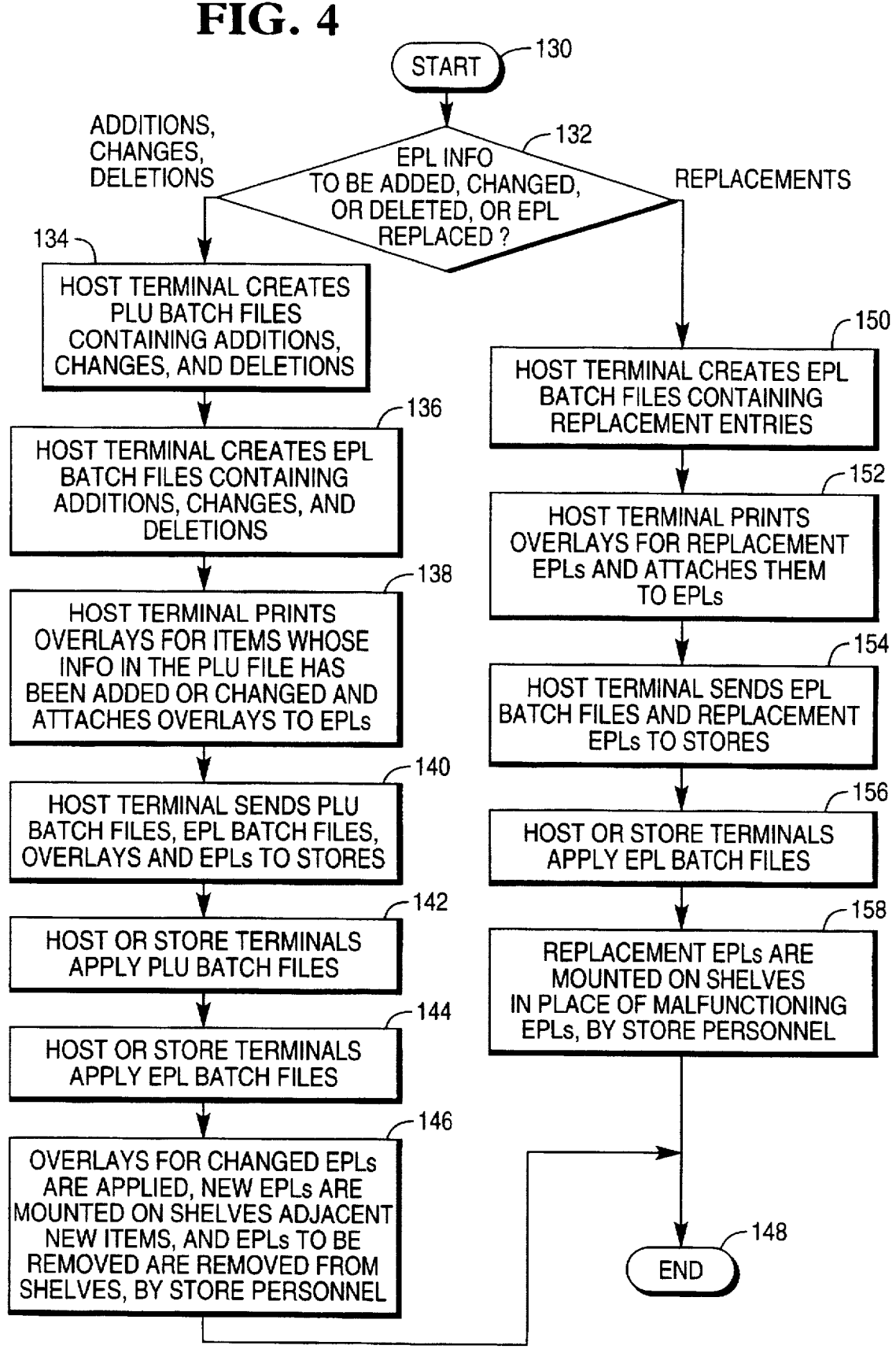
FIG. 4 is a flow diagram of a second embodiment of the EPL support method of the present invention.

Turning now to FIG. 4, a second method for controlling system 10 begins with START 130. In this method, the central office has total control over EPL additions, changes, deletions, and replacements. The central office provides EPLs to be used for new entries in EPL data file 32 and for replacing existing EPLs.

In step 132, the method determines whether EPL information is to be added, changed, or deleted, or whether an EPL is to be replaced.

If the former, host terminal 13 creates PLU batch files 52 containing additions, changes, and deletions in step 134.

In step 136, host terminal 13 creates EPL batch files 33 containing additions, changes and deletions.

In step 138, host terminal 13 prints overlays 55 for items whose information in PLU data file 44 has been added or changed using overlay printer 68, and attaches overlays 55 to the new EPLs.

In step 140, host terminal 13 sends PLU batch files 52, EPL batch files 33, overlays 55, and EPLs 22 to the stores.

In step 142, host terminal 13 or main computers 12 apply PLU batch files 52.

In step 144, host terminal 13 or main computers 12 apply EPL batch files 33 to modify EPL data files 32 by either adding information for new EPLs, changing information for predetermined existing EPLs, and deleting information for EPLs to be removed.

In step 146, overlays for changed EPLs are applied, new EPLs are mounted on shelves adjacent new items, and EPLs to be removed are removed from shelfs, by store personnel and the method ends in step 148.

Returning now to step 132, if EPLs are to be replaced because they are malfunctioning, host terminal 13 creates EPL batch files 33 to modify EPL data files 32 to replace information for old EPLs with information for new EPLs in step 150.

In step 152, host terminal 13 prints overlays 55 for replacement EPLs using overlay printer 68, and attaches overlays 55 to the EPLs.

In step 154, host terminal 13 sends EPL batch files 33 and replacement EPLs to the stores.

In step 156, host terminal 13 or main terminals 12 apply EPL batch files 33.

In step 158, replacement EPLs are mounted on shelves in place of the malfunctioning EPLs by store personnel.

The method ends at step 148.

Figure 5A:
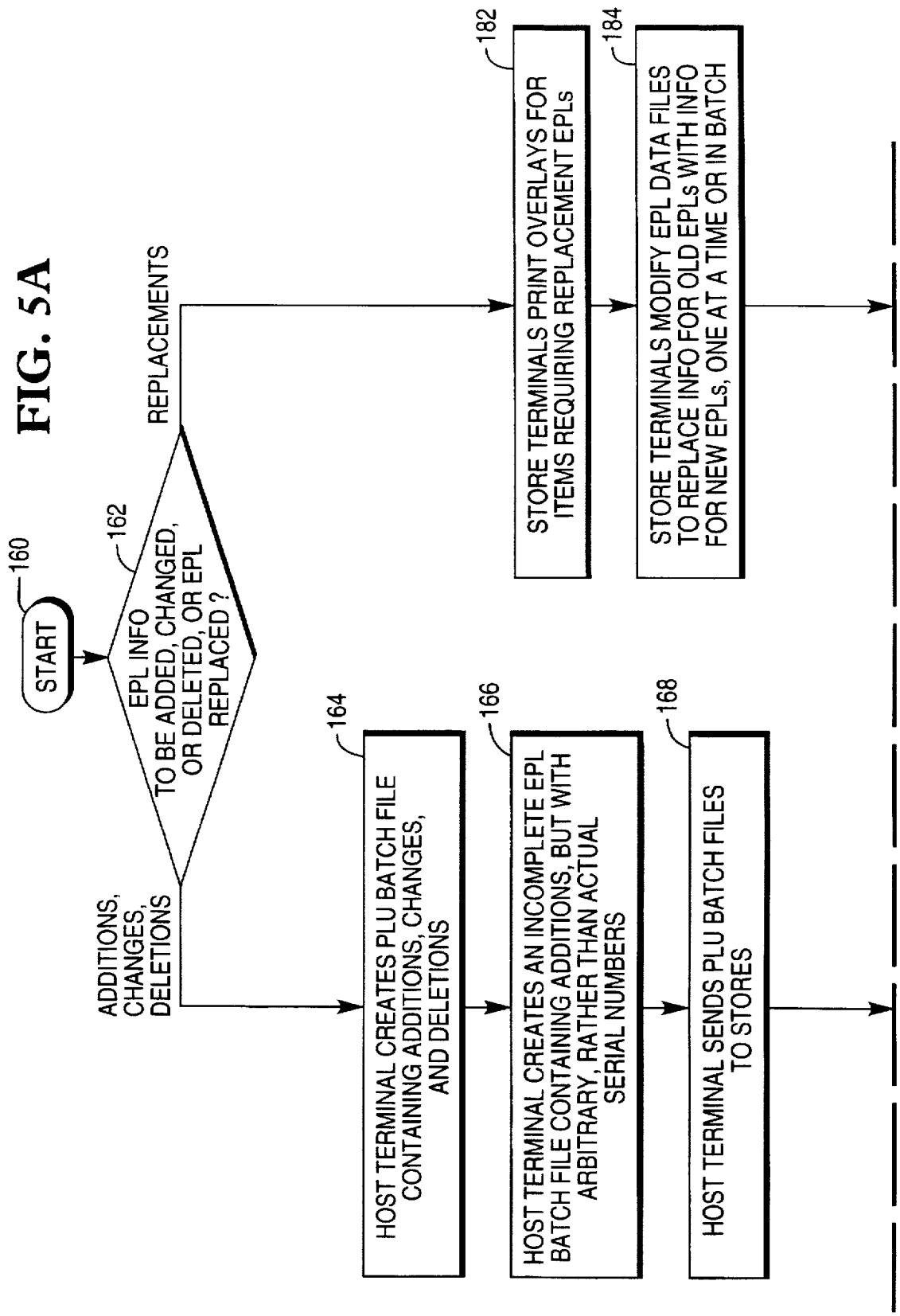
FIGS. 5A and 5B form a flow diagram of a third embodiment of the EPL support method of the present invention.
Figure 5B:
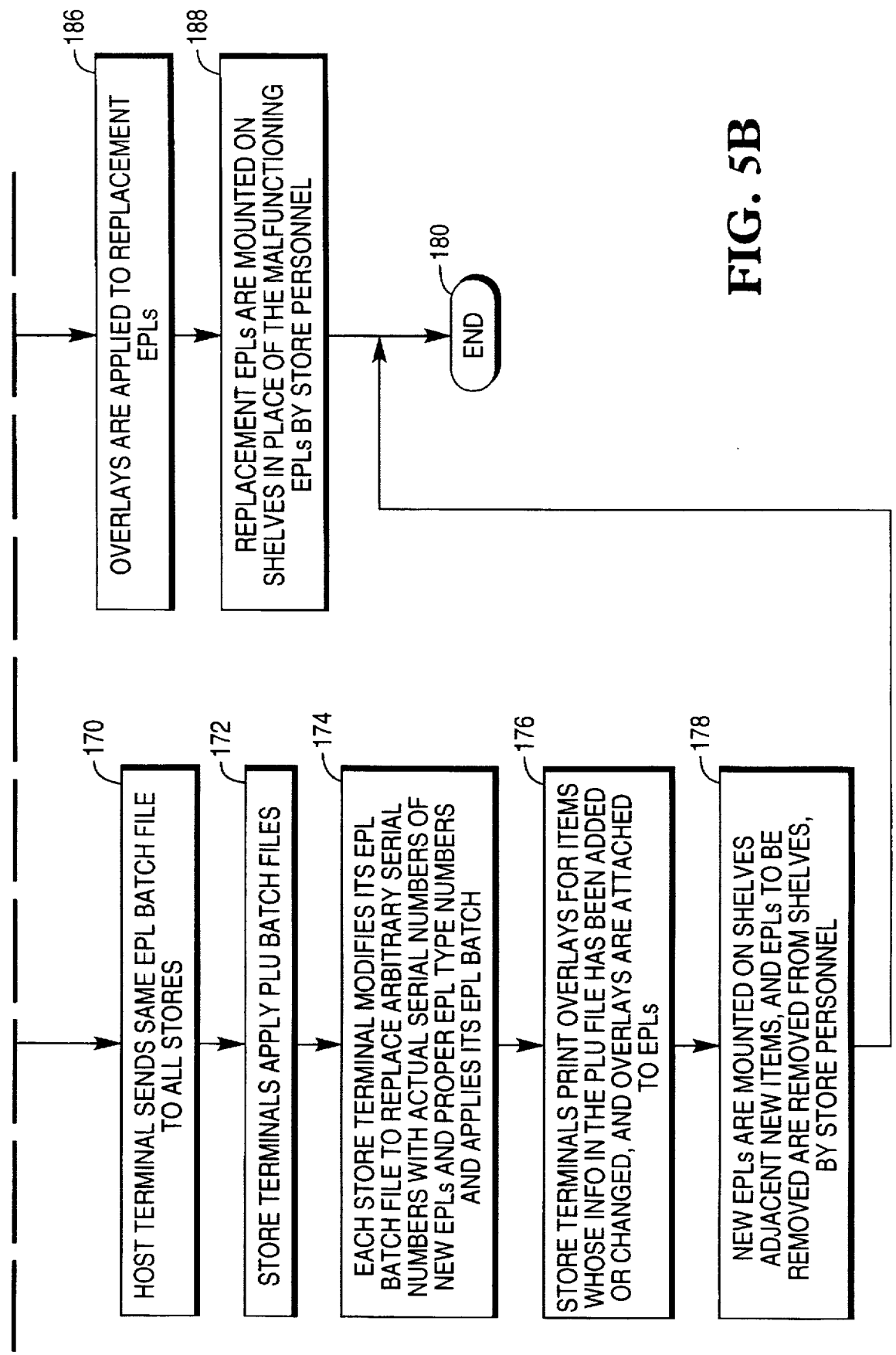

Turning now to FIGS. 5A and 5B, a third method for controlling system 10 begins with START 160. In this method, the central office and the stores share control over EPL additions, changes, deletions, and replacements. Stores provide EPL modules to be used for new entries in EPL data files 32 and for replacement of existing EPLs. Host terminal 13 creates incomplete EPL batch files 52 containing additions, but with an arbitrary sequence of serial numbers, rather than actual serial numbers. Main terminals 12 prompt an operator to replace the arbitrary serial numbers with actual serial numbers.

In step 162, the method determines whether EPL information is to be added, changed, or deleted, or whether an EPL is to be replaced.

If the former, host terminal 13 creates PLU batch files 52 containing additions, changes, and deletions in step 164.

In step 166, host terminal 13 creates incomplete EPL batch files 52 containing additions, but with arbitrary rather than actual serial numbers. For example, the additional EPLs may be numbered in sequence, starting with the numeral one.

In step 168, host terminal 13 sends PLU batch files 52 to main computers 12 in the chain of stores.

In step 170, host terminal 13 sends a same EPL batch file 33 to all stores.

In step 172, main computers 12 apply PLU batch files 52.

In step 174, each main computer 12 modifies its EPL batch file 33 to replace the arbitrary serial numbers with actual numbers of new EPLs with the proper EPL types. This batch file can contain modifies and deletes. The EPL batch file is applied.

In step 176, main computers 12 print overlays 55 for items whose information in the PLU files 44 has been added or changed using overlay printer 64, and overlays 55 are attached to the EPLs, either by an overlay application machine or by hand.

In step 178, new EPLs are mounted on shelves adjacent new items, and EPLs to be removed are removed from shelfs, by store personnel and the method ends in step 180.

Returning now to step 162, if EPLs are to be replaced because they are malfunctioning, main computers 12 print overlays 55 for items requiring replacement EPLs in step 182.

In step 184, main computers 12 modify EPL data files 32 to replace information for old EPLs with information for new EPLs, one at a time or in batch.

In step 186, overlays 55 are applied to replacement EPLs, either by an overlay application machine or by hand.

In step 188, replacement EPLs are mounted on shelves in place of the malfunctioning EPLs by store personnel.

The method ends at step 180.

Figure 6A:
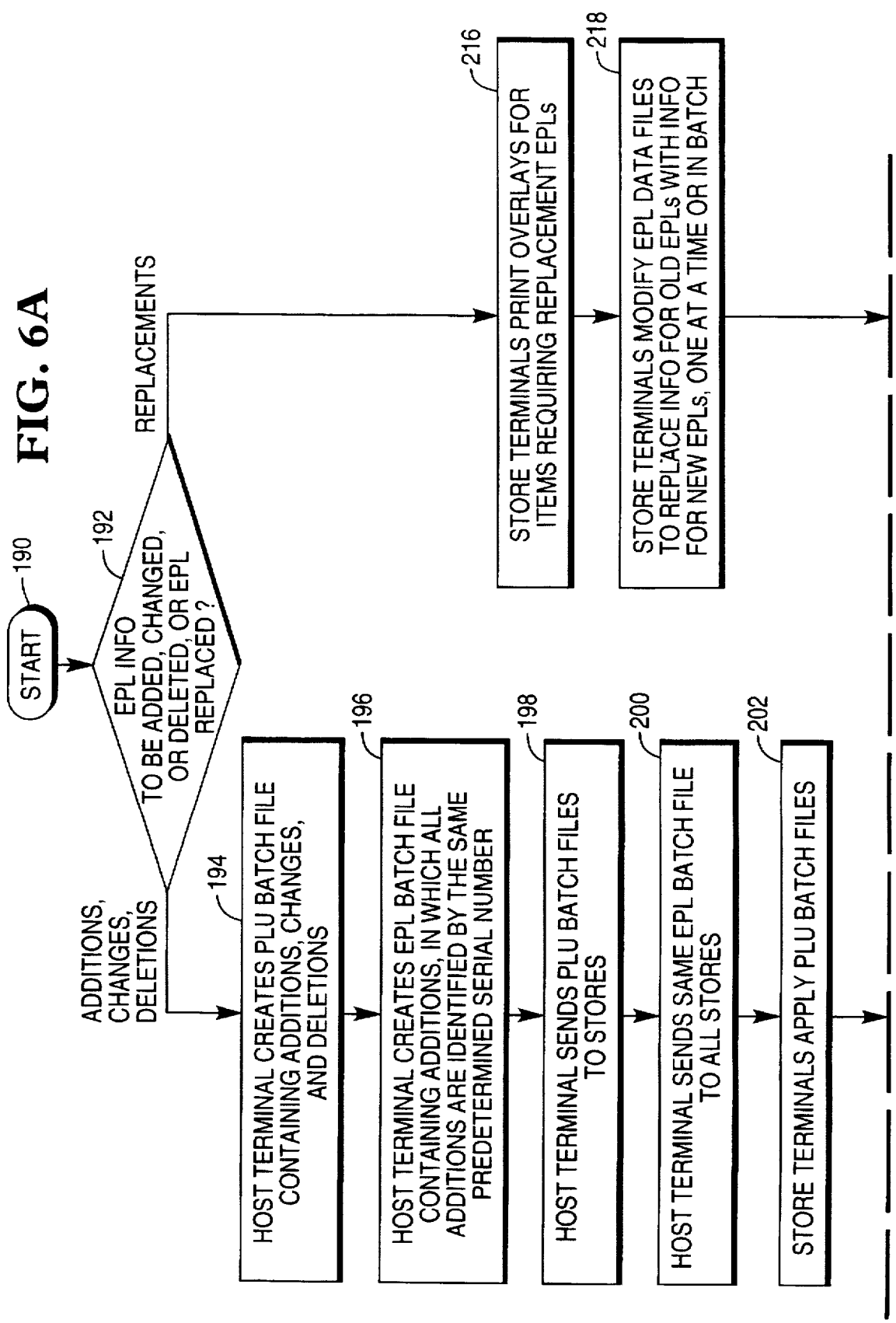
FIGS. 6A and 6B form a flow diagram of a fourth embodiment of the EPL support method of the present invention.
Figure 6B:
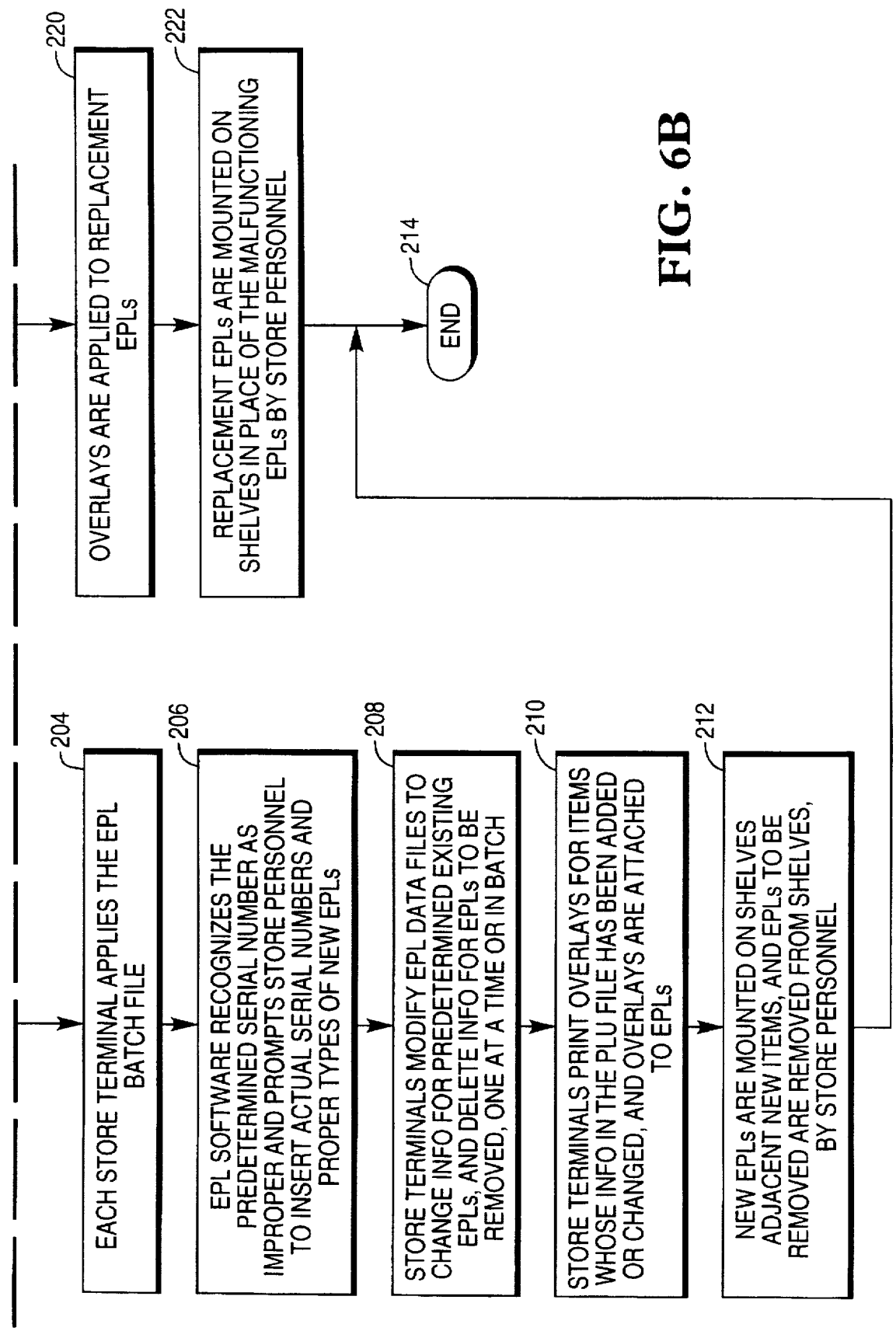

Turning now to FIGS. 6A and 6B, a fourth method for controlling system 10 begins with START 190. In this method, the central office and the stores share control over EPL additions, changes, deletions, and replacements. Stores provide EPL modules to be used for new entries in EPL data files 32 and for replacement of existing EPLs. Additional EPLs all carry the same serial number, which an EPL software recognizes as improper, and prompts an operator to enter an actual EPL serial number and proper type of new EPL.

In step 192, the method determines whether EPL information is to be added, changed, or deleted, or whether an EPL is to be replaced.

If the former, host terminal 13 creates PLU batch files 52 containing additions, changes, and deletions in step 194.

In step 196, host terminal 13 creates incomplete EPL batch files 52 containing additions, but in which all additions are identified by the same predetermined serial number. For example, all additional EPLs may be identified by the number "FFFFFFFF".

In step 198, host terminal 13 sends PLU batch files 52 to main computers 12 in the chain of stores.

In step 200, host terminal 13 sends the same EPL batch file 33 to all stores.

In step 202, main computers 12 apply PLU batch files 52.

In step 204, each main computer 12 applies the EPL batch file 33.

In step 206, EPL software 30 recognizes the predetermined serial number as improper and prompts store personnel to insert actual EPL serial numbers and proper types of new EPLs.

In step 208, each main computer 12 modifies its EPL data files 32 to change information for predetermined existing EPLs, and delete information for EPLs to be removed, one at a time or in batch.

In step 210, main computers 12 print overlays 55 for items whose information in the PLU files 44 has been added or changed using overlay printer 64, and overlays 55 are attached to the EPLs, either by an overlay application machine or by hand.

In step 212, new EPLs are mounted on shelves adjacent new items, and EPLs to be removed are removed from shelfs, by store personnel and the method ends in step 214.

Returning now to step 192, if EPLs are to be replaced because they are malfunctioning, main computers 12 prints overlays 55 for items requiring replacement EPLs in step 216.

In step 218, main computers 12 modify EPL data files 32 to replace information for old EPLs with information for new EPLs, one at a time or in batch.

In step 220, overlays 55 are applied to replacement EPLs, either by an overlay application machine or by hand.

In step 222, replacement EPLs are mounted on shelves in place of the malfunctioning EPLs by store personnel.

The method ends at step 214.

Figure 7B:
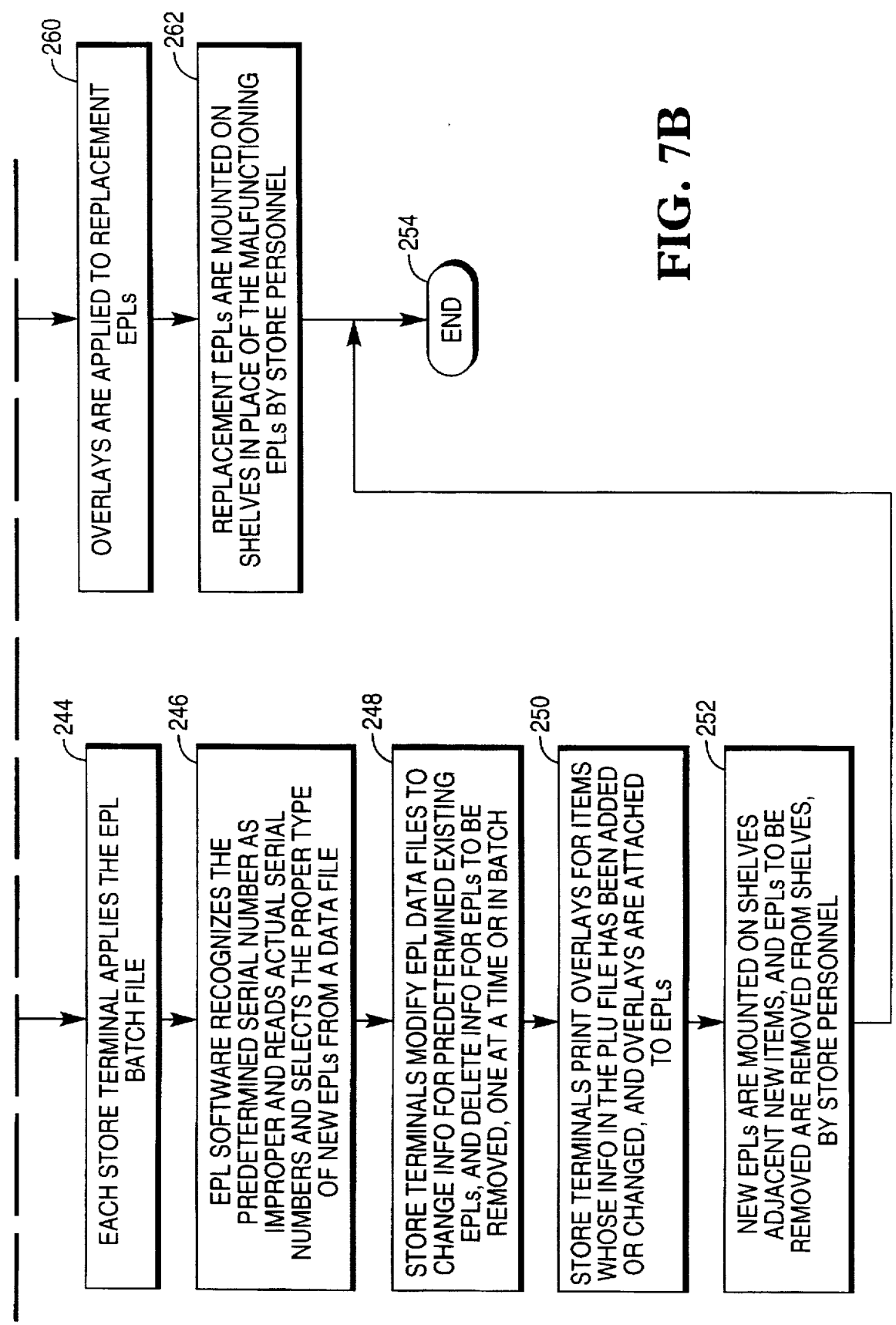

Turning now to FIGS. 7A and 7B, a fifth method for controlling system 10 begins with START 230. In this method, the central office and the stores share control over EPL additions, changes, deletions, and replacements. Stores provide EPL modules to be used for new entries in EPL data files 32 and for replacement of existing EPLs. Additional EPLs all carry the same serial number, which an EPL software 30 recognizes as improper, reads actual EPL serial numbers and proper types of new EPLs from a data file, and assigns actual serial numbers to the EPLs.

In step 232, the method determines whether EPL information is to be added, changed, or deleted, or whether an EPL is to be replaced.

If the former, host terminal 13 creates PLU batch files 52 containing additions, changes, and deletions in step 234.

In step 236, host terminal 13 creates incomplete EPL batch files 52 containing additions, but in which all additions are identified by the same predetermined serial number. For example, all additional EPLs may be identified by the number "FFFFFFFF".

In step 238, host terminal 13 sends PLU batch files 52 to main computers 12 in the chain of stores.

In step 240, host terminal 13 sends the same EPL batch file 33 to all stores.

In step 242, main computers 12 apply PLU batch files 52.

In step 244, each main computer 12 applies the EPL batch file 33.

In step 246, EPL software 30 recognizes the predetermined serial number as improper and reads and inserts actual EPL serial numbers and proper types of new EPLs from a data file.

In step 248, each main computer 12 modifies its EPL data files 32 to change information for predetermined existing EPLs, and delete information for EPLs to be removed, one at a time or in batch.

In step 250, main computers 12 print overlays 55 for items whose information in the PLU files 44 has been added or changed using overlay printer 64, and overlays 55 are attached to the EPLs, either by an overlay application machine or by hand.

In step 252, new EPLs are mounted on shelves adjacent new items, and EPLs to be removed are removed from shelfs, by store personnel and the method ends in step 254.

Returning now to step 232, if EPLs are to be replaced because they are malfunctioning, main computers 12 print overlays 55 for items requiring replacement EPLs in step 256.

In step 258, main computers 12 modify EPL data files 32 to replace information for old EPLs with information for new EPLs, one at a time or in batch.

In step 260, overlays 55 are applied to replacement EPLs, either by an overlay application machine or by hand.

In step 262, replacement EPLs are mounted on shelves in place of the malfunctioning EPLs, by store personnel.

The method ends at step 254.

Although the present invention has been described with particular reference to certain preferred embodiments thereof, variations and modifications of the present invention can be effected within the spirit and scope of the following claims.

What is claimed is:

1. A method of adding a new EPL to an EPL system within a transaction establishment comprising the steps of:

creating a PLU batch file for adding a new item, which is associated with the new EPL, and a price for the new item to a PLU data file of the transaction establishment by a host computer;

creating an EPL batch file for adding a single temporary identification number for the new EPL to an EPL data file of the transaction establishment by the host computer;

sending the PLU batch file and the EPL batch file to the transaction establishment;

applying the PLU batch file to add the new item and its price to the PLU data file by a main computer;

modifying the EPL batch file to replace the temporary identification number with an actual identification number of the EPL by the main computer; and applying the modified EPL batch file to add information about the new EPL by the main computer.

2. The method as recited in claim 1, further comprising the steps of:

printing an overlay for the new EPL by the main computer; and applying the overlay to the new EPL.

3. The method as recited in claim 1, wherein the step of modifying comprises the substeps of:

recognizing the temporary identification number by the main computer; and prompting an operator to insert actual EPL identification numbers by the main computer.

4. A method of adding a new EPL to an EPL system within a transaction establishment comprising the steps of:

creating a PLU batch file for adding a new item, which is associated with the new EPL, and a price for the new item to a PLU data file of the transaction establishment by a host computer;

creating an EPL batch file for adding a single temporary identification number for the new EPL to an EPL data file of the transaction establishment by the host computer;

sending the PLU batch file and the EPL batch file to the transaction establishment;

applying the PLU batch file to add the new item and its price to the PLU data file by the main computer;

modifying the EPL batch file to replace the temporary identification number with an actual identification number of the EPL by the main computer, including the substeps of recognizing the temporary identification number by the main computer, and prompting an operator to insert actual EPL identification numbers by the main computer; and applying the modified EPL batch file to add information about the new EPL by the main computer.

* * * * *